UNITED STATES PATENT OFFICE.

WILSON B. ANGSTADT AND KILBURN H. CLEAVER, OF READING, PENNSYLVANIA.

METHOD OF MAKING FERTILIZERS.

SPECIFICATION forming part of Letters Patent No. 683,014, dated September 24, 1901.

Application filed May 15, 1901. Serial No. 60,375. (No specimens.)

*To all whom it may concern:*

Be it known that we, WILSON B. ANGSTADT and KILBURN H. CLEAVER, citizens of the United States, residing at Reading, in the county of Berks and State of Pennsylvania, have invented certain new and useful Improvements in Processes of Making Fertilizers; and we do hereby declare the following to be a full, clear, and exact description of the invention, such as will enable others skilled in the art to which it appertains to make and use the same.

This invention relates to improvements in the process of making fertilizers.

It consists of a simple, cheap, and effective manner of reducing green or raw refuse table and kitchen matter, commonly called "garbage," directly to a marketable product. The process whereby this is accomplished is fully described in the following specification.

We take the green or raw material, a combination of vegetable and animal matter such as comprises the offal from the table and kitchen, in any quantity that can be handled conveniently and apply thereto sulfuric acid that has been heated to approximately 400° Fahrenheit in greater quantity than is sufficient to reduce said matter to a pulpy condition. A quantity of ground phosphate rock is then added to this mass, and the surplus sulfuric acid contained in said mass will acidulate the phosphate rock, while at the same time a certain proportion of the moisture therein will be absorbed by said rock. After this is done a sufficient quantity of another suitable absorbing material, such as dry earth, is added to the mass to thoroughly absorb all free moisture or liquid contained therein, leaving a substantially dry substance. This substance is then put through the usual screening and grinding process, and the result is a high-grade fertilizer in granulated form derived directly from animal and vegetable refuse at a minimum of time and expense.

Having thus fully described our invention, what we claim as new, and desire to secure by Letters Patent, is—

The process of making fertilizer from refuse vegetable and animal matter by first treating said matter in a raw state with highly-heated sulfuric acid, in a quantity more than sufficient to reduce said matter to a pulpy condition, then adding ground phosphate rock which is acidulated by the surplus sulfuric acid, then adding a suitable dry substance to absorb the remaining moisture, and finally screening and grinding said substance, substantially as described.

In testimony whereof we affix our signatures in presence of two witnesses.

WILSON B. ANGSTADT.
KILBURN H. CLEAVER.

Witnesses:
B. A. FRYER,
FRED H. WITMAN.